Oct. 15, 1957  A. HAMMER  2,809,563
CARTRIDGE BELT LINK
Filed Jan. 29, 1953  2 Sheets-Sheet 1
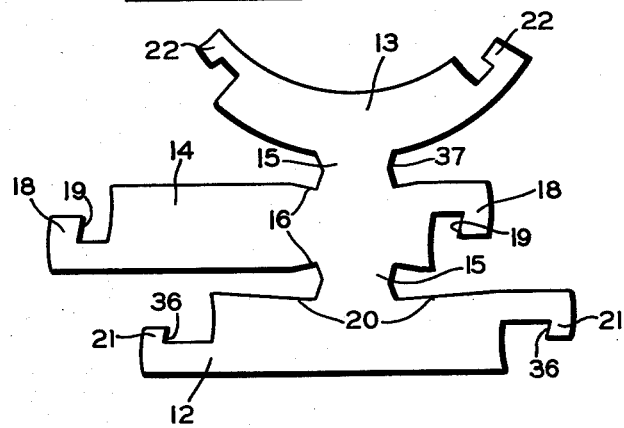
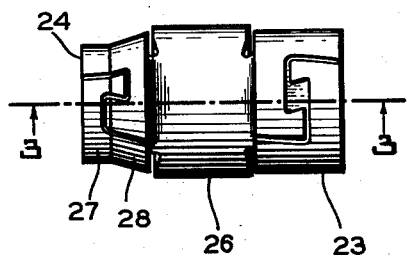
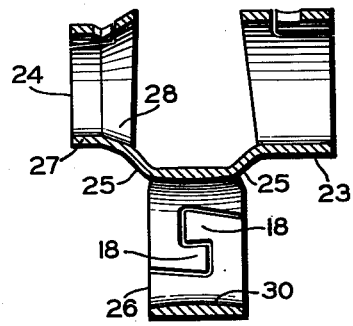
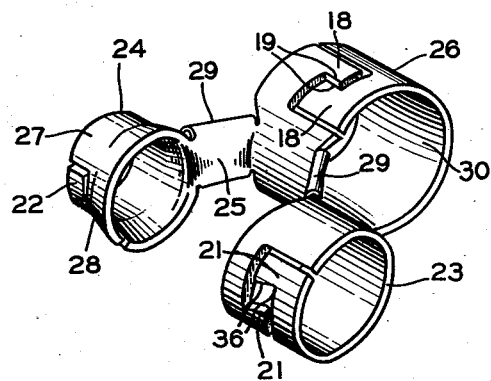
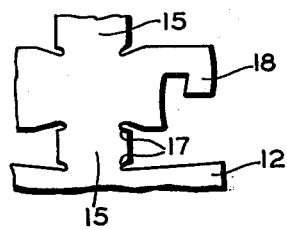
INVENTOR.
Alexander Hammer
BY
W. E. Thibodeau + A. W. Dew
ATTORNEYS Oct. 15, 1957 A. HAMMER 2,809,563
CARTRIDGE BELT LINK
Filed Jan. 29, 1953 2 Sheets-Sheet 2
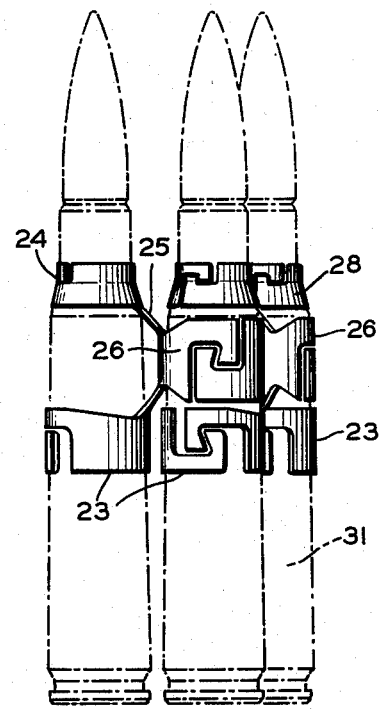
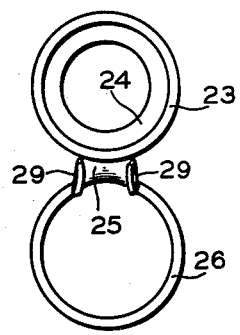
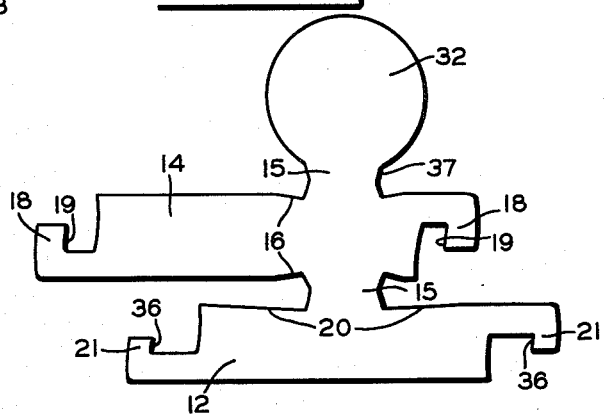
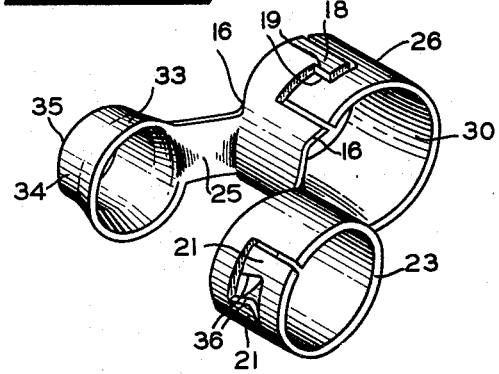
INVENTOR.
Alexander Hammer
BY
W. E. Thibodeau + A. W. Dew
ATTORNEYS

United States Patent Office 2,809,563
Patented Oct. 15, 1957

2,809,563

CARTRIDGE BELT LINK

Alexander Hammer, Springfield, Mass., assignor to the United States of America as represented by the Secretary of the Army Application January 29, 1953, Serial No. 334,105

1 Claim. (Cl. 89—35)

(Granted under Title 35, U. S. Code (1952), sec. 266)

The invention described herein may be manufactured and used by or for the Government for governmental purposes without the payment of any royalty thereon.

This invention relates to articulated ammunition belts of the type generally employed in the continuous feeding of cartridges into rapid firing automatic firearms and is more particularly directed to novel improvements in the links which hold the individual cartridges in flexible hinged relationship.

Heretofore, cartridge belt links have been fabricated from specially treated sheet steel of suitable physical characteristics by being pressed or formed into the required shape and thereafter subjected to a series of tempering operations to obtain the required strength and resiliency. Although these links have proven acceptable, there exist several undesirable factors which the art has continually striven to overcome. For example, the necessity for high grade alloy steels which require extremely critical heat treatments obviously introduces relatively costly and complex procedures in the fabrication of the links by present day mass production techniques. Another drawback in the use of steel for the fabrication of cartridge belt links lies in the known tendency of ferrous metals to invite relatively rapid electrolytic corrosion effects when subject to contact with the brass of standard cartridge cases.

In view of these disadvantages, it has been proposed in several instances to fabricate cartridge belt links from materials such as synthetic organic plastics which are not only readily available and relatively inexpensive but are light in weight and resistant to corrosion as well. It has been found, however, that plastic links invariably fail to withstand the relatively large stresses and strains encountered during the high speed feeding of long ammunition belts. Extensive testing has revealed that, even at ordinary temperatures, the loops of these plastic links stretch to such an extent as to seriously reduce the necessary cartridge gripping functions thereof. The stretching of the loops also results in an undesirable increase in the critical pitch distance between adjacent cartridges.

The present invention therefore has for its primary object, the provision of a link for a disintegrating type of cartridge belt wherein the strength and resiliency thereof will be substantially equivalent to that obtained in ordinary ferrous type links while maintaining the light weight and corrosion-resisting characteristics inherent in plastic type links.

It is well-known that aluminum alloys provide these desirable qualities of light weight and resistance to corrosion. However, the fabrication of high strength links from aluminum alloys has heretofore been considered impractical since the yield strength thereof is approximately one-third as great as that of comparable ferrous alloys and the percentage of elongation is roughly three times as great. Such reasoning, however, has overlooked the fact that the stresses and elongation produced in a closed loop type of link are only about one-third as great as those which occur in a conventional open type loop under the same conditions.

It is therefore a further object of this invention to provide a cartridge belt link fabricated from aluminum alloy and constructed to be the equivalent in strength and resiliency of conventional types of ferrous links.

Although cartridge belt links of aluminum alloy must be of closed loop construction in order to withstand the higher stresses encountered during the feeding of cartridges into the gun, such construction fails to furnish the optimum resiliency necessary to position each link uniformly on the cartridge despite variations in the dimensional tolerances thereof and provide adequate gripping of the walls of the cartridge associated therewith. These link functions are best obtained with an open loop type of construction.

Accordingly, it is another object of this invention to provide a cartridge belt link structure wherein the cartridge engaging loops are normally open and yet are arranged to close when the cartridges are inserted therein during assembly of the ammunition belt.

Disintegrating types of metallic cartridge belt links are customarily formed to include a pair of aligned, axially-spaced, cartridge-receiving loops and a single loop extending outwardly away from the pair of loops at a point opposite the space therebetween. The front loop of the aligned pair is commonly referred to as the "neck loop" and is primarily intended to position the link on the cartridge while the rear loop grips the body of the cartridge and is termed the "extracting loop." The single loop is arranged to loosely engage the body of the adjacent cartridge at a point thereon between the aligned pair of loops of the adjacent link and is known as the "hinge loop." The hinge loop is connected with the neck and extracting loops by bridge portions which also serve to receive the thrust of a transversely reciprocal feeding pawl by means of which the belt is intermittently advanced into the feedway of the firearm. It has been found, however, that contact between the belt feeding pawl and the bridge portions causes such deformation along the edges thereof as to prevent the possible re-use of the links.

It is therefore another object of this invention to provide an aluminum alloy cartridge belt link having means for resiliently cushioning the impacts thereon of the belt feeding pawl in the firearm.

Although, the positioning function of the neck loop is best achieved with a normally open expansible loop adapted to close upon attaining the proper location on the cartridge, the configuration of such an open loop requires a more complicated fabrication than would be encountered if the loop were originally formed as a closed ring. The consequent ease of manufacture of a completely closed loop is believed to outweigh the slight advantages achieved by the superior positioning ability of an open type of loop. However, this desirable combination of open and closed loops has heretofore been unattainable due to the concurrent requirement that the link be formed from a one-piece blank.

It is therefore still another object of this invention to provide a one-piece blank of aluminum alloy from which a disintegrating cartridge belt link can be readily formed with normally open extracting and hinge loops and a completely closed neck loop.

It is a specific object of this invention to provide a light weight disintegrating type of cartridge belt link having improved corrosion-resistant qualities and being particularly adapted for the feeding of cartridges into relatively high rate automatic firearms.

The specific nature of this invention as well as other objects and advantages thereof will clearly appear from a description of a preferred embodiment as shown in the accompanying drawings in which:

Fig. 1 is a developed view of the blank from which the link of Figs. 2–3 is fabricated;

Fig. 2 is a front view of a preferred form of the cartridge belt link of this invention;

Fig. 3 is a cross-sectional view taken along the line 3—3 of Fig. 2;

Fig. 4 is a fragmentary view of a blank to show a modified central construction therefor;

Fig. 5 is a perspective view of a link formed from a blank of the type shown in Fig. 1 but provided with the central portion of Fig. 4;

Fig. 6 is a top view of a small section of an assembled cartridge belt employing the link of Figs. 2–3;

Fig. 7 is an end view of the link shown in Fig. 5;

Fig. 8 is a developed view of a blank for forming an alternate type of link having a completely closed neck loop; and Fig. 9 is a perspective view of the link formed from the blank shown in Fig. 8.

Referring now to the drawings, the blank from which the link of Figs. 2–3 is formed essentially comprises a substantially rectangular portion 12, an oppositely disposed arcuate portion 13, and a substantially rectangular intermediate portion 14 joined to portions 12 and 13 by means of transversely extending strip portions 15. Rectangular portion 14 is provided with inwardly tapered sections 16 at the points of junction with strip portions 15 for a purpose which will hereinafter appear. The opposite edges of strip portions 15 are of V-shaped form as shown at 37 for a reason to be later explained. Intermediate portion 14 terminates at either end thereof in oppositely facing hook-like portions 18. The inner edge of each hook-like end 18 is inclined as shown at 19 so that when such ends are interfitted, inclined edges 19 are positioned for subsequent mating engagement as will be later explained.

As shown at 20, the inner edges of rectangular portion 12 are also tapered at the junction with strip portions 15 but such tapered edges extend for a greater distance along portion 12 than do the inwardly tapered sections 16 of rectangular portion 14. The opposite ends of rectangular portion 12 also terminate in oppositely facing hook-like portions 21 having inclined inner edges 36 similar in configuration to hook-like portions 18 but spaced at a relatively greater distance from the body of rectangular portion 12. Arcuate portion 13 is similarly provided with oppositely facing hook-like ends 22 which, unlike hook-like ends 18 and 21, are of substantially rectangular construction.

Through suitable pressing and forming operations, the blank of Fig. 1 is converted to the finished link of Figs. 2–3. Such link comprises a pair of spaced-apart, axially-aligned loops 23 and 24 joined by a bridge portion 25 from which a third loop 26 projects outwardly opposite the space between loops 23 and 24. Loop 23 is the cartridge extracting loop and is of cylindrical configuration with hook-link ends 21 normally in interfitting spaced-apart relationship with inclined edges 36 in position for mating contact upon expansion of the entire loop. Loop 24 is the neck loop and comprises a substantially cylindrical outer end portion 27 and an adjacent inner flared portion 28. Loop 26 is the hinge loop and is of cylindrical configuration having a concavely formed interior surface as best shown at 30 in Fig. 3. The V-shaped configuration of strips 15 permits the bending of the junction portions so that the opposite ends of each bridge portion 25 are not unduly stressed when the link has been formed. It will also be noted that bridge portions 25 are of symmetrical construction and are so located between loops 23, 24 and 26 as to maintain the central axes thereof in substantially the same plane. Such structure permits ammunition belt to be fed into a gun from either end with the same ease unlike prior art links which require the belt to be fed only from the end comprising the extracting and neck loops.

In order to provide a more resilient surface for contact by the firearm member which operates to feed the links and the cartridges held thereby into position for chambering, strip portions 15 may be provided with recessed corners at the junctions with portions 12, 13 and 14 as indicated at 17 in Fig. 4 which permit the edges to be rolled over as best shown at 29 in Fig. 5 during the forming of the link.

To form the ammunition belt illustrated in Fig. 6, the hinge loop 26 of one link is placed between loops 23 and 24 of the adjacent link and a cartridge 31 inserted through the three axially aligned loops. The interior diameter of extracting loop 23 is such that the bullet end of cartridge 31 passes readily therethrough but is of smaller diameter than the body portion of cartridge 31. Consequently, as cartridge 31 continues to be forced forwardly, extracting loop 23 is expanded to resiliently grip the body of cartridge 31 while neck loop 24 operates similarly to grip the neck portion thereof. Cartridge 31 is properly positioned in the link when flared portion 28 of neck loop 24 engages the angular shoulder between the neck and body portions of the cartridge. Since hinge loop 26 is of slightly greater diameter than the body portion of cartridge 31 projecting therethrough, such cartridge is loosely held by loop 26 to permit tilting thereof to the extent determined by the contact with the outer edges of the concavely formed interior wall surfaces 30. This tilting provides the free helical and fan-wise flexibility required of the belt and is materially aided by the inwardly tapered edges 16 on either side of hinge loop 26 and the tapered edges 20 of the extracting loop 23 of the adjacent link.

The assembly of cartridges 31 into the links to form an ammunition belt causes loops 23 and 24 to expand until hook-like ends 21 and 22 intermesh. At this point, loops 23 and 24 are properly positioned on cartridge 31. The expansion of loops 23 and 24 increases the diameters thereof as measured along an axis at right angles to the feeding movement of cartridges 31 and thereby creates stresses which are a maximum at those areas diametrically opposite the open ends of the loops. These stresses are, of course, tensile in character at the interior wall surfaces of each loop and compressive at the outside wall surfaces. When the ammunition belt is being fed through a firearm, the forces acting on each link tend to increase the diameter of loops 23 and 24 as measured in the direction of feeding movement of cartridges 31 thereby inducing compressive stresses in the interior wall surfaces thereof and tensile stresses in the exterior wall surfaces. It can readily be seen, therefore, that the tensile and compressive stresses induced in loops 23 and 24 as a result of the assembly of a cartridge 31 therein are completely nullified by the opposite stresses induced through the pulling forces imparted to the loops during the feeding of the ammunition belt into the gun. As a result, the total pulling force on loops 23 and 24 is reduced by the amount of the force required to expand the loops. Thus, links of these types of loops can be subjected to greater pulling forces than would be possible with continuously open loops. It is such a factor which permits the links to be fabricated from aluminum alloy even through the yield strength thereof is approximately one-third of that encountered in the prior art ferrous types of disintegrating cartridge belt links and the elongation is substantially three times as great. Hinge loop 26 is, of course, only subject to the forces applied thereto during the feeding movement of the cartridge belt.

Although the open type of neck loop 24 is entirely satisfactory in operation, the complexity of manufacture thereof makes it desirable to employ an alternate construction wherein the neck loop is fabricated as a completely closed ring. However, in order to obtain a link having the combination of normally open extracting and hinge loops and a continuously closed neck loop, the one-piece blank from which the link is to be fabricated must have the configuration disclosed in Fig. 8. This blank is similar in all respects to that of Fig. 1 except that the previous arcuate section is now a circular section 32. By means of suitable deep drawing processes, section 32 can be formed into the shape of a cup having an upper outwardly flaring section 33. Thus, when the stock at the bottom of the cup is removed as by a piercing operation, there remains a ring-shaped section 34 which together with section 33 serves as a neck loop 35 as shown in Fig. 9.

Accordingly, there is here provided a superior cartridge belt disintegrating type of link which, though fabricated from an aluminum alloy, is the equivalent in strength to the conventional ferrous type link, moreover, the links of the present invention are particularly adapted for fabrication from a one-piece blank even though the neck loop is designed to be formed as a completely closed structure. Furthermore, the use of aluminum alloy for making these links provides a light weight structure which is far superior to that of steel in its resistance to corrosion. Obviously, the decrease in weight of these links permits a higher firing rate of the firearm since less force is required to accomplish the feeding of the cartridge belt. Another advantage in the use of aluminum alloys for cartridge belt links is the reduced frictional resistance which exists between aluminum and brass and substantially diminishes the force required to extract the cartridges therefrom. This ease of cartridge extraction compared to prior art types of ferrous links plays an important role in increasing the rate of fire of the firearm.

I claim:

A one-piece cartridge belt link fabricated from a planar blank of aluminum alloy and comprising, in combination an integrally closed ring having adjacent cylindrical and conical sections respectively engageable with the neck and inclined shoulder of a cartridge for effecting the proper position thereof in the link, a normally open expandable loop spaced rearwardly from said cartridge positioning loop in coaxial alignment therewith for resiliently gripping the body of a cartridge, said cartridge gripping loop having oppositely facing, interfitting hook-like end portions adapted to interlock and form a closed loop construction under the tensile stress produced by the insertion of a cartridge, and a normally open expandable hinge loop offset from said cartridge positioning ring and said cartridge gripping loop opposite the space therebetween, said hinge loop being of greater diameter than that of a cartridge and having oppositely facing, interfitting hook-like end portions adapted to interlock and form a closed loop construction under the tensile stresses imparted thereto during the feeding movements of the entire cartridge belt.

References Cited in the file of this patent

UNITED STATES PATENTS 2,480,950     Murphy _____ Sept. 6, 1949

OTHER REFERENCES

Troendly: abstract of application Serial No. 676,842, published February 28, 1950, vol. 631, page 1206 O. G.